E. JONES.
Pan-Broilers.
No. 156,797.            Patented Nov. 10, 1874.
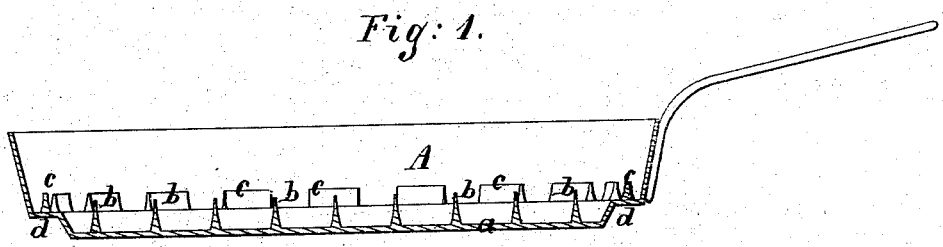
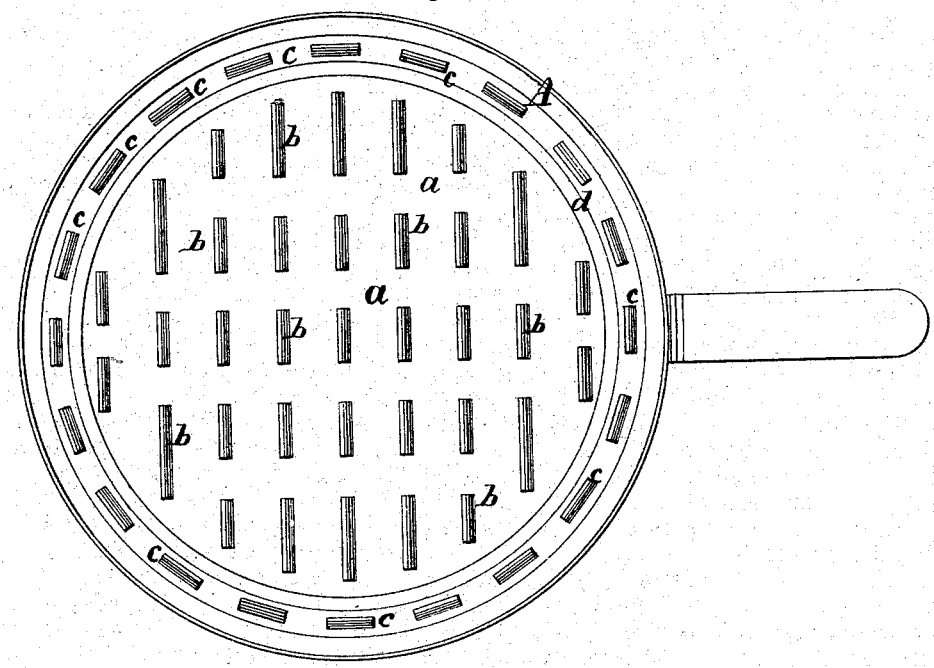

UNITED STATES PATENT OFFICE.

EDWARD JONES, OF NEW YORK, N. Y.

IMPROVEMENT IN PAN-BROILERS.

Specification forming part of Letters Patent No. 156,797, dated November 10, 1874; application filed October 15, 1874.

*To all whom it may concern:*

Be it known that I, EDWARD JONES, of the city, county, and State of New York, have invented a certain new and Improved Pan-Broiler, of which the following is a specification:

This invention is illustrated in the accompanying drawing, in which—

Figure 1 represents a longitudinal vertical section. Fig. 2 is a plan or top view.

Similar letters indicate corresponding parts.

My invention has for its object to improve upon that class of pan-broilers the bottoms of which are provided with hollow cones or corrugations, which support the meat to be broiled; and my invention consists in a pan-broiler which is provided with a raised rim or flange, upon which is located a series of teeth or ribs, arranged circumferentially thereon, while the bottom proper of said pan is provided with a series of teeth, the arrangement being such that if a piece of meat is placed upon the teeth or ribs, and the pan placed into the hole of a stove or range, the heat radiating from its bottom will also strike that portion of the meat which is supported by the circumferential teeth or ribs, and thereby the operation of broiling meat of any kind is materially facilitated.

In the drawing, the letter A designates a pan, from the bottom a of which rise a series of detached teeth, b, so that if the pan is placed on a stove or range, and a piece of meat is put in, such piece will rest upon the teeth b, and the heat radiating from the bottom of the pan, being free to circulate between said teeth, will be uniformly diffused under the meat. The bottom a of my pan is provided with a raised flange or rim, d, so that the pan will fit the hole of a stove or range, and that it can be depressed to any desired degree in order to obtain the necessary proximity to the fire. On said raised rim are formed a series of teeth, c, and if the pan is filled with meat, those pieces which are near the circumference of the pan will be partly supported by said circumferential teeth c. By these means the heat which radiates from the bottom of the pan is free to diffuse uniformly under all the meat in the pan, and the entire quantity of meat will be broiled uniformly throughout.

It will be seen from this description that in my pan the operation of broiling is effected without exposing the meat to the direct action of the fire, and my experiments show that in my pan meat of any kind, such as beefsteaks, fowls, and fishes, can be broiled uniformly throughout in a very short time, and the flavor of the meat is not spoiled by smoke or gases rising from the fire.

Furthermore, I can broil meat at any stage of the fire, and I am not obliged to wait until the fire ceases to smoke, thereby economizing fuel and time.

What I claim as new, and desire to secure by Letters Patent, is—

1. In a pan-broiler, the raised rim or flange d, provided with a series of teeth or ribs, c, arranged circumferentially thereon, substantially as and for the purposes specified.

2. The teeth c, arranged circumferentially on the raised rim or flange d, in combination with the teeth or ribs b, rising from the bottom of the pan, substantially as described.

In testimony that I claim the foregoing I have hereunto set my hand this 7th day of October, 1874.

EDWARD JONES.

Witnesses:
W. HAUFF,
E. F. KASTENHUBER.